United States Patent
Lin

(10) Patent No.: US 6,925,243 B2
(45) Date of Patent: Aug. 2, 2005

(54) LIGHT GUIDE PLATE WITH PARALLEL PROTRUSIONS AND SURFACE LIGHT SOURCE UNIT INCORPORATING THE SAME

(75) Inventor: Jyh-Chain Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/889,880

(22) Filed: Jul. 12, 2004

(65) Prior Publication Data

US 2005/0008320 A1 Jan. 13, 2005

(30) Foreign Application Priority Data

Jul. 11, 2003 (TW) ........................................ 92119084 A

(51) Int. Cl.⁷ .............................. G02B 6/10; F21V 7/04
(52) U.S. Cl. .................... 385/901; 385/146; 362/31; 362/339
(58) Field of Search ................................. 385/146, 901; 362/26, 31, 329, 330, 333, 339

(56) References Cited

U.S. PATENT DOCUMENTS

| | | | |
|---|---|---|---|
| 5,779,337 A | * 7/1998 | Saito et al. | 362/31 |
| 6,123,431 A | * 9/2000 | Teragaki et al. | 362/31 |
| 6,155,692 A | 12/2000 | Ohkawa | 362/31 |
| 6,631,988 B2 | * 10/2003 | Shirayanagi et al. | 351/177 |
| 6,816,214 B1 | * 11/2004 | Ohsumi | 349/65 |

* cited by examiner

*Primary Examiner*—Frank G. Font
*Assistant Examiner*—Christopher M. Kalivoda
(74) *Attorney, Agent, or Firm*—Wei Te Chung

(57) ABSTRACT

A surface light source unit (3) includes a light source (31) and a light guide plate (30). The light guide plate includes a light incidence surface (301) for receiving light beams, an emission surface (302) for emitting the light beams, and a bottom surface (303) for scattering and diffusing the light beams. A plurality of diffusion dots (311) is formed on the bottom surface and a plurality of protrusions (312) parallel to the light incidence surface is formed on the emission surface with decreasing an interval between two adjacent protrusions as goes away from the light incidence surface. The amount (N) of the protrusions satisfies a condition of N=R/220, wherein R is a distance from the light incidence surface to an opposite surface of the light guide plate. The surface light source unit provides uniform illumination and high brightness for a liquid crystal display panel.

19 Claims, 2 Drawing Sheets

LIGHT GUIDE PLATE WITH PARALLEL PROTRUSIONS AND SURFACE LIGHT SOURCE UNIT INCORPORATING THE SAME

BACKGROUND OF THE INVENTION

1. Field of the Invention

The present invention relates to a light guide plate and a surface light source unit using the same, and especially to a light guide plate providing highly uniform illumination and high brightness.

2. Description of Prior Art

Recently, liquid crystal display devices have undergone remarkable improvements, and their market has been steadily growing. These devices save installation space by virtue of their slimness, and they can also save on power consumption.

Liquid crystal displays commonly use a surface light source unit to provide illumination. The surface light source unit includes a light guide plate having a uniform thickness or being wedge-shaped. The light guide plate distributes light from a substantially linear source such as a cold cathode fluorescent lamp (CCFL), in order to provide substantially even illumination to the LCD.

FIG. 4 shows a conventional surface light source unit 1, which comprises a light source 11, a light guide plate 13 adjacent to the light source 11, a reflective plate 12, a diffusing plate 14 and a prism plate 15. The reflective plate 12 and the diffusing plate 14 are disposed under and on top of the light guide plate 13, respectively. The prism plate 15 is disposed on the diffusing plate 14, and has a plurality of prisms 151. Light beams from the light source 11 enter the light guide plate 13 through a light incidence surface 131 thereof. Some of the light beams are diffused and reflected by a bottom surface 133 of the light guide plate 13, and emit from an emission surface 132 of the light guide plate 13. Other light beams emit from the bottom surface 133, are reflected by the reflective plate 12 back into the light guide plate 13, and then emit from the emission surface 132. The light beams emitted from the emission surface 132 are diffused by the diffusing plate 14, and then enter the prism plate 15. The prism plate 15 improves the directivity of the light beams, so that the surface light source unit 1 has a predetermined directivity.

However, the surface light source unit 1 has an unduly large number of parts. This makes assembly of the surface light source unit 1 complicated, and inflates costs.

FIG. 5 shows another conventional surface light source unit 2, which comprises a light source 21, a light guide plate 20 and a reflective plate 23. The light guide plate 22 comprises a light incidence surface 201, a bottom surface 203 having a plurality of diffusion dots 221 formed thereon, and an emission surface 202 having a plurality of parallel prisms 222 formed thereon. The prisms 222 are arranged on the emission surface 202 contiguously, and are parallel to the light incidence surface 201. However, the light intensity distribution in the light guide plate 22 is not uniform. Accordingly, the surface light source unit 2 cannot provide uniform illumination.

It is desired to provide a light guide plate that solves the above-mentioned problems.

SUMMARY OF THE INVENTION

An object of the present invention is to provide a surface light source unit which provides uniform illumination and high brightness for a liquid crystal display panel.

To achieve the above object, the surface light source unit of the present invention includes a light source and a light guide plate. The light source is adjacent to the light guide plate for emitting light beams. The light guide plate includes a light incidence surface for receiving the light beams from the light source, an emission surface for emitting the light beams, a bottom surface opposite to the emission surface. A plurality of diffusion dots is formed on the bottom surface, and a plurality of protrusions parallel to the light incidence surface is formed on the emission surface. Intervals between adjacent protrusions progressively decrease with increasing distance away from the light incidence surface. The number (N) of the protrusions is calculated according to the formula N=R/220, wherein R is a distance in micrometers from the light incidence surface to an opposite surface of the light guide plate. The protrusions have triangular cross-sections. An apex angle of each protrusion is in the range from 60 degrees to 120 degrees. A height of the protrusions is in the range from 15 micrometers to 25 micrometers. The surface light source unit can thus provide uniform illumination and high brightness for a liquid crystal display panel.

Other objects, advantages, and novel features of the present invention will become more apparent from the following detailed description when taken in conjunction with the accompanying drawings, in which:

DETAILED DESCRIPTION OF THE INVENTION

Figure 1:
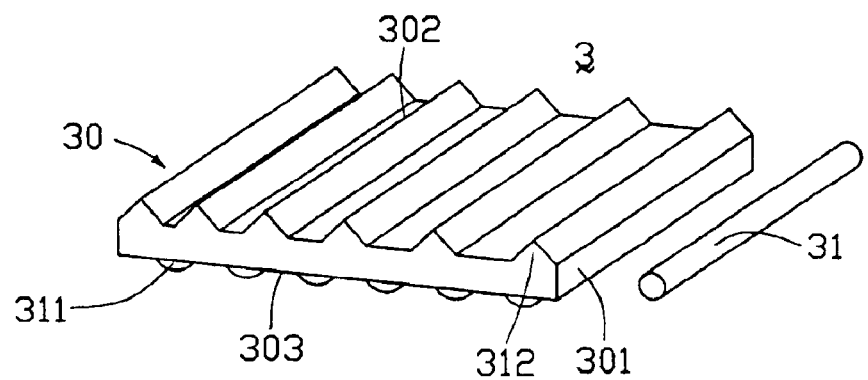
FIG. 1 is an exploded, isometric view of a surface light source unit according to a preferred embodiment of the present invention.

FIG. 1 shows an exploded, isometric view of a surface light source unit 3 in accordance with a preferred embodiment of the present invention. The surface light source unit 3 comprises a light source 31 and a light guide plate 30.

The light guide plate 30 is generally rectangular, and includes a light incidence surface 301, an emission surface 302 and a bottom surface 303 opposite to the emission surface 302. The bottom surface 303 has a plurality of diffusion dots 311 formed thereon. The emission surface 302 has a plurality of parallel protrusions 312 formed thereon. In the preferred embodiment, the protrusions 312 are triangular prisms that are parallel to the light incidence surface 301. The light guide plate 30 is made of a material with efficient transmission capability. Such material may be an acrylic resin, such as polymethyl methacrylate (PMMA).

The light source 31 is a linear light source, such as a cold cathode fluorescent lamp (CCFL). The light source 31 is disposed adjacent to the light incidence surface 301 of the light guide plate 30.

The diffusion dots 311 are preferably hemispherical or sub-hemispherical. Other alternative shapes can also be selected, such as cylindrical, frustum-shaped or parallelepiped-shaped. To promote uniformity of light beams passing out through the emission surface 302, sizes of the diffusion dots 311 progressively increase with increasing distance away from the light incidence surface 301 of the light guide plate 30. Alternatively, the diffusion dots 311 may be configured to be uniform in size, but progressively increase in number with increasing distance away from the light incidence surface 301. Such configuration likewise achieves said uniformity of the light beams.

Figure 2:
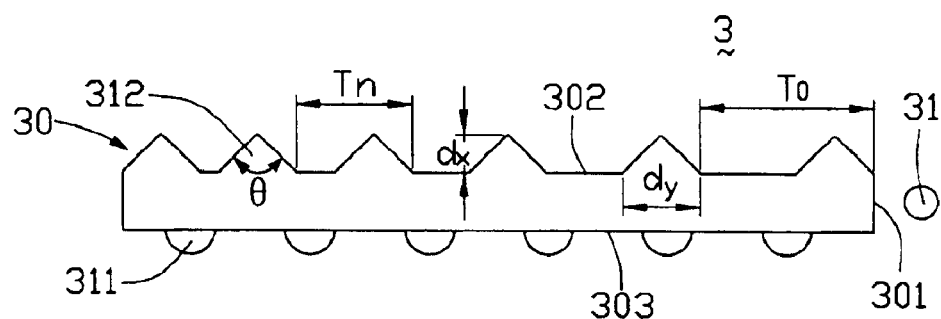
FIG. 2 is a side elevation of the surface light source unit of FIG. 1.

FIG. 2 shows a side elevation of a light guide plate of the surface light source unit of FIG. 1. The protrusions 312 are provided discontinuously on the emission surface 302, with intervals between adjacent protrusions 312. The protrusions 312 thus provide the light guide plate 30 with a generally serrated profile. A base width $d_y$ of each protrusion 312 is 40 micrometers. A height $d_x$ of each protrusion 312 is in the range from 15 micrometers to 25 micrometers. An apex angle θ of each protrusion 312 is in the range from 60 degrees to 120 degrees. In the preferred embodiment, $d_x$=20 micrometers and θ=90 degrees. A number N of the protrusions 312 is calculated according to the formula N=R/220, wherein R is a distance in micrometers from the light incidence surface 301 to an opposite surface of the light guide plate 30. The intervals between adjacent protrusions 312 linearly decrease with increasing distance away from the light incidence surface 301. The interval $T_n$ between any two adjacent protrusions 312 is calculated according to the formula:

$$T_n=T_0-a(n-1)$$

wherein $T_0$ is a constant equal to 400 micrometers, n is a natural number from 1 to N, and a is a coefficient equal to 360/(N−1) micrometers. In alternative embodiments, a cross-section of each protrusion 312 may be other than triangular; for example, rectangular or polygonal. The light guide plate 30 is made by injection molding, so that the protrusions 312 are integrally formed on the emission surface 302.

Figure 3:
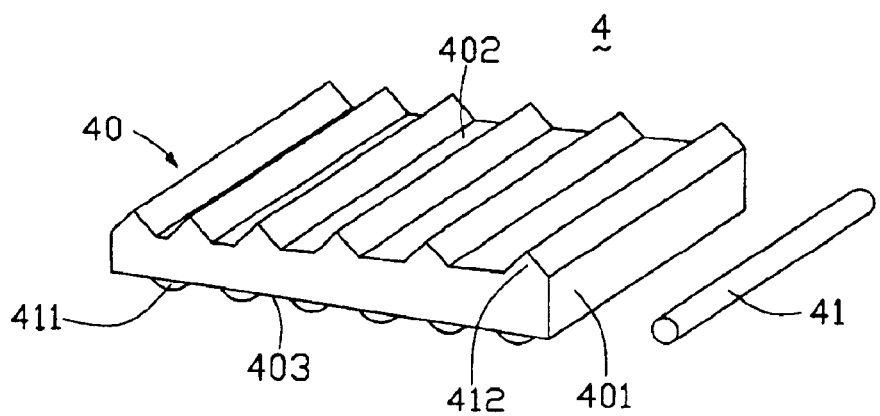
FIG. 3 is an exploded, isometric view of a surface light source unit according to an alternative embodiment of the present invention.
Figure 4:
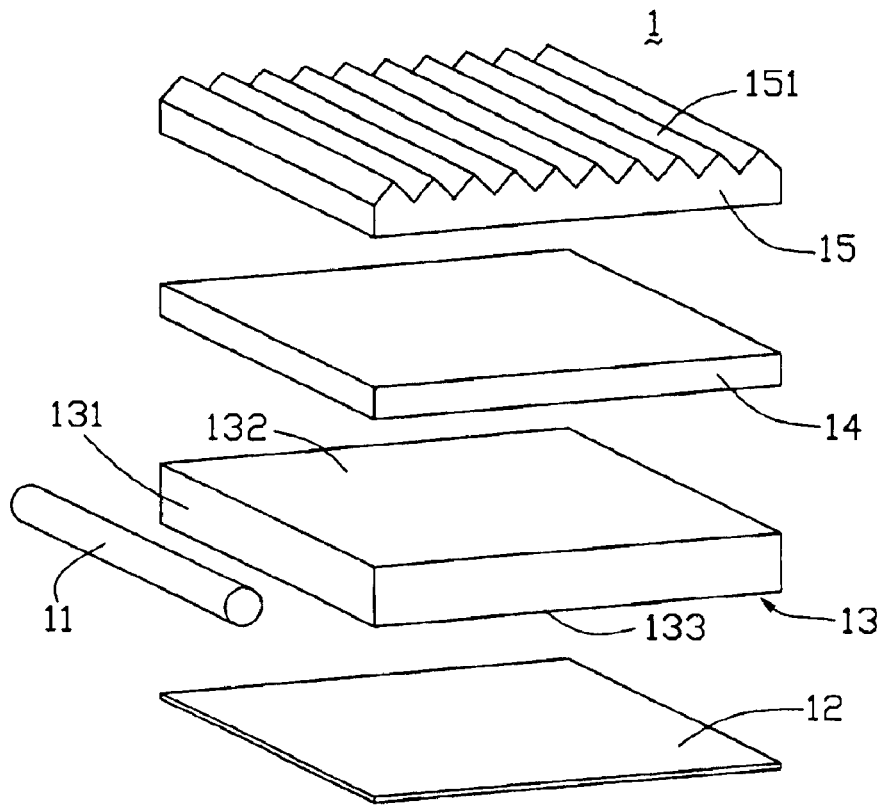
FIG. 4 is an exploded, isometric view of a conventional surface light source unit.
Figure 5:
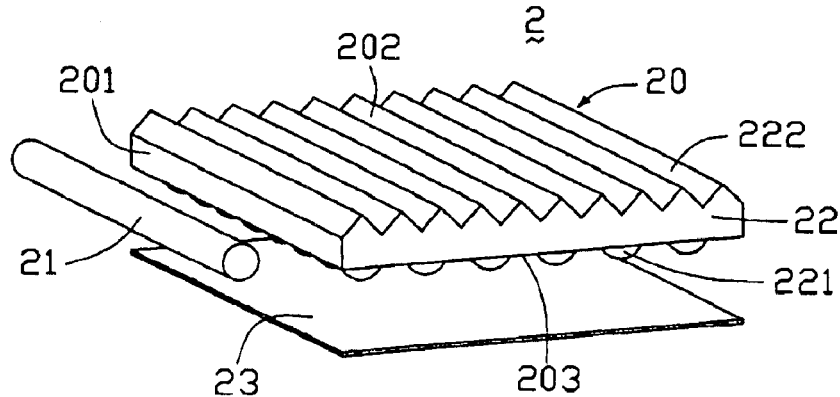
FIG. 5 is an exploded, isometric view of another conventional surface light source unit.

FIG. 3 shows a surface light source unit 4 of the alternative embodiment of the present invention. The surface light source unit 4 is similar to the surface light source 3 described above. Like reference numerals in FIG. 3 indicate like parts to those of FIG. 1. The main difference is that the light guide plate 40 of the surface light source unit 4 is wedge-shaped.

In the preferred embodiment of the present invention, a reflective plate (not shown) is provided under the bottom surface 303, 403 of the light guide plate 30, 40. The reflective plate is used to reflect the light beams emitted from the bottom surface 303, 403 back into the light guide plate 30, 40, in order to prevent loss of light beams. Alternatively, a reflective film may be deposited on the bottom surface 303, 403.

In operation, the light source 31, 41 emits light beams into the light guide plate 30, 40. One portion of the incident light beams is reflected and scattered by the diffusion dots 311, 411, and emitted out through the emission surface 302, 402. A remaining portion of the light beams is emitted from the bottom surface 303, 403 to an outside of the light guide plate 30, 40, where said light beams are reflected by the reflective plate back into the light guide plate 30, 40.

In summary, the surface light source unit 3, 4 according to the present invention has the following main advantages. First, the protrusions 312, 412 are formed on the emission surface 302, 402 with successively smaller intervals therebetween. Therefore, even though the intensity of light beams emitted from the light source 31, 41 diminishes along the direction from the light incidence surface 301, 401 to said opposite surface, the diffusing effects of the protrusions 312, 412 enable the emission surface 302, 402 to be lit with substantially uniform brightness. Thus the surface light source unit 3, 4 can provide uniform illumination. Second, the protrusions 312, 412 formed on the emission surface 302, 402 define a substantially serrated surface. Thus the light output efficiency of the emission surface 302, 402 is increased, and the brightness of the surface light source unit 3, 4 is increased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A light guide plate comprising:
   a light incidence surface for receiving light beams;
   an emission surface for emitting the light beams;
   a bottom surface opposite to the emission surface for scattering and diffusing the light beams; and
   a plurality of protrusions formed on the emission surface, intervals between adjacent protrusions progressively decreasing with increasing distance away from the light incidence surface, and number (N) of the protrusions being calculated according to the formula N=R/220, wherein R is a distance in micrometers from the light incidence surface to an opposite surface of the light guide plate.

2. The light guide plate as claimed in claim 1, wherein the protrusions have triangular cross-sections.

3. The light guide plate as claimed in claim 2, wherein an apex angle of each of the protrusions is in the range from 60 degrees to 120 degrees.

4. The light guide plate as claimed in claim 2, wherein the protrusions have a height in the range from 15 micrometers to 25 micrometers.

5. The light guide plate as claimed in claim 1, wherein a distance $T_n$ between two adjacent protrusions is calculated according to the formula:

$$T_n=T_0-a(n-1)$$

where $T_0$ is a constant equal to 400 micrometers, n is a natural number from 1 to N, and a is a coefficient equal to 360/(N−1) micrometers.

6. The light guide plate as claimed in claim 1, further comprising a plurality of diffusion dots formed on the bottom surface.

7. The light guide plate as claimed in claim 6, wherein sizes of the diffusion dots vary according to their distances from the light incidence surface.

8. A light guide plate comprising:
   a light incidence surface for receiving light beams;
   an emission surface for emitting the light beams;
   a bottom surface opposite to the emission surface for scattering and diffusing the light beams; and
   a plurality of protrusions formed on the emission surface, intervals between adjacent protrusions progressively decreasing with increasing distance away from the light incidence surface, a distance between two adjacent protrusions being calculated according to the formula:

$$T_n=T_0-a(n-1)$$

wherein $T_0$ is a constant equal to 400 micrometers, n is a natural number from 1 to N, a is a coefficient equal to 360/(N−1) micrometers, and N is the number of protrusions.

9. The light guide plate as claimed in claim 8, wherein the protrusions have triangular cross-sections.

10. The light guide plate as claimed in claim 9, wherein an apex angle of each of the protrusions is in the range from 60 degrees to 120 degrees.

11. The light guide plate as claimed in claim 9, wherein the protrusions have a height in the range from 15 micrometers to 25 micrometers.

12. The light guide plate as claimed in claim 8, wherein the number N of protrusions is calculated according to the formula N=R/220, wherein R is a distance in micrometers from the light incidence surface to an opposite surface of the light guide plate.

13. The light guide plate as claimed in claim 8, further comprising a plurality of diffusion dots formed on the bottom surface.

14. The light guide plate as claimed in claim 13, wherein sizes of the diffusion dots vary according to their distances from the light incidence surface.

15. A surface light source unit comprising:
    a light source for emitting light beams; and
    a light guide plate disposed adjacent to the light source, comprising:
        a light incidence surface for receiving light beams;
        an emission surface for emitting the light beams;
        a bottom surface opposite to the emission surface for scattering and diffusing the light beams; and
        a plurality of protrusions formed on the emission surface, intervals between adjacent protrusions progressively decreasing with increasing distance away from the light incidence surface, a number (N) of the protrusions being calculated according to the formula N=R/220, wherein R is a distance in micrometers from the light incidence surface to an opposite surface of the light guide plate.

16. The surface light source unit as claimed in claim 15, wherein the protrusions have triangular cross-sections.

17. The surface light source unit as claimed in claim 16, wherein an apex angle of each of the protrusions is in the range from 60 degrees to 120 degrees.

18. The surface light source unit as claimed in claim 16, wherein the protrusions have a height in the range from 15 micrometers to 25 micrometers.

19. The surface light source unit as claimed in claim 15, wherein a distance between two adjacent protrusions is calculated according to the formula:

$$T_n = T_0 - a(n-1)$$

where $T_0$ is a constant equal to 400 micrometers, n is a natural number from 1 to N, and a is a coefficient equal to 360/(N−1) micrometers.

* * * * *